United States Patent
Choo et al.

(10) Patent No.: US 8,451,231 B2
(45) Date of Patent: May 28, 2013

(54) TOUCH SCREEN PANEL, METHOD OF MANUFACTURING THE SAME, AND DISPLAY HAVING THE SAME

(75) Inventors: Dae Ho Choo, Seongnam (KR); Yang Suk Ahn, Yongin (KR); Yeon Hee Yu, Suwon (KR)

(73) Assignee: Samsung Display Co., Ltd. (KR)

( * ) Notice: Subject to any disclaimer, the term of this patent is extended or adjusted under 35 U.S.C. 154(b) by 1574 days.

(21) Appl. No.: 11/888,933

(22) Filed: Aug. 2, 2007

(65) Prior Publication Data

US 2008/0030483 A1 Feb. 7, 2008

(30) Foreign Application Priority Data

Aug. 3, 2006 (KR) .................. 10-2006-0073433

(51) Int. Cl.
*G06F 3/041* (2006.01)

(52) U.S. Cl.
USPC .................................... 345/173; 178/18.04

(58) Field of Classification Search
USPC .................. 345/173, 174, 177; 178/18.04
See application file for complete search history.

(56) References Cited

U.S. PATENT DOCUMENTS

| | | | |
|---|---|---|---|
| 4,777,329 A | 10/1988 | Mallicoat | |
| 5,308,936 A | 5/1994 | Biggs et al. | |
| 5,657,054 A * | 8/1997 | Files et al. | 345/177 |
| 5,673,041 A * | 9/1997 | Chatigny et al. | 341/22 |
| 5,760,346 A * | 6/1998 | Kobayashi et al. | 178/18.04 |
| 6,087,599 A | 7/2000 | Knowles | |
| 6,498,603 B1 * | 12/2002 | Wallace | 345/177 |
| 6,661,399 B1 * | 12/2003 | Oh et al. | 345/87 |
| 6,724,371 B1 | 4/2004 | Shenholtz et al. | |
| 6,731,270 B2 | 5/2004 | Tosaya | |
| 6,948,371 B2 * | 9/2005 | Tanaka et al. | 73/649 |
| 7,187,369 B1 * | 3/2007 | Kanbara et al. | 345/177 |
| 7,489,304 B2 * | 2/2009 | Nakazawa et al. | 345/173 |
| 7,545,365 B2 * | 6/2009 | Kent et al. | 345/173 |
| 2002/0101408 A1 * | 8/2002 | Sano et al. | 345/173 |
| 2003/0076308 A1 * | 4/2003 | Sano et al. | 345/177 |
| 2003/0234773 A1 | 12/2003 | Sano et al. | |

(Continued)

FOREIGN PATENT DOCUMENTS

| | | |
|---|---|---|
| CN | 2519331 | 10/2002 |
| CN | 1122363 C | 9/2003 |

(Continued)

OTHER PUBLICATIONS

European Search Report for EP2293171 A3, Dec. 7, 2011.

(Continued)

*Primary Examiner* — Joe H Cheng
(74) *Attorney, Agent, or Firm* — Innovation Counsel LLP

(57) ABSTRACT

Disclosed herein is a touch screen panel, a method of manufacturing the touch screen panel, and a display having the touch screen panel. Ultrasonic excitation and detection transducers are attached to the front surface of the image display unit of a display, thereby implementing the touch screen panel. The substrate of the display, that is, the upper surface of the image display unit is used as a surface acoustic wave propagation medium, so that it is not required to manufacture the touch screen panel in a separate substrate and to attach the substrate, in which the touch screen panel is manufactured, to the image display unit of the display, thereby not only preventing degradation of image quality but also not increasing the thickness and size thereof.

24 Claims, 6 Drawing Sheets

U.S. PATENT DOCUMENTS

| | | | |
|---|---|---|---|
| 2004/0066379 A1* | 4/2004 | Ise et al. | 345/175 |
| 2004/0239647 A1 | 12/2004 | Endo | |
| 2006/0038792 A1* | 2/2006 | Sano et al. | 345/173 |

FOREIGN PATENT DOCUMENTS

| | | |
|---|---|---|
| CN | 1528050 A | 9/2004 |
| CN | 1771612 A | 5/2006 |
| JP | 2002-182843 | 6/2002 |
| JP | 2002-313142 | 10/2002 |
| JP | 2002-342027 | 11/2002 |
| JP | 2002-342028 | 11/2002 |
| JP | 2002-541603 A | 12/2002 |
| JP | 2003-029930 | 1/2003 |
| JP | 2004-030083 | 1/2004 |
| JP | 2004-054485 | 2/2004 |
| JP | 2004-78613 | 3/2004 |
| JP | 2004-355092 | 12/2004 |
| JP | 2006-48453 | 2/2006 |
| JP | 2006-059169 | 3/2006 |
| JP | 2006-99608 | 4/2006 |
| KR | 2005-28319 | 3/2005 |
| KR | 2005-38645 | 4/2005 |
| KR | 10-0533642 | 10/2005 |
| KR | 10-2006-0017450 | 2/2006 |
| KR | 2006-21852 | 3/2006 |
| TW | 200608272 | 3/2006 |
| WO | 9839729 A | 9/1998 |
| WO | 0062268 | 10/2000 |

OTHER PUBLICATIONS

Supplementary Partial European Search Report for EP 1169692, Jan. 9, 2002.

* cited by examiner

TOUCH SCREEN PANEL, METHOD OF MANUFACTURING THE SAME, AND DISPLAY HAVING THE SAME

CROSS-REFERENCE TO RELATED APPLICATIONS

This application claims benefit of priority to Korean Patent Application No. 10-2006-0073433 filed on Aug. 3, 2006, which is incorporated herein by reference in its entirety.

TECHNICAL FIELD

The present invention relates generally to a touch display.

BACKGROUND

Touch screen panels used for displays, such as Liquid Crystal Displays (LCDs) and Plasma Display Panels (PDPs), Light Emitting Diode Displays (LEDDs), or Cathode Ray Tubes (CRTs), are generally attached to the front surfaces of the image display units, and are used as auxiliary devices.

There is a disadvantage in that the touch screen panel degrades the inherent characteristics of the display. A substrate identical in size to that of the image display must be placed over the display unit in order to form a touch screen panel. Therefore, the overall thickness of the display is increased. Furthermore, optical characteristics may be degraded due to the light transmittance of the touch screen panel and the occurrence of a Newton's Ring phenomenon due to light interference effects in the gap between the display unit surface and the touch screen panel, and within layers included in the touch screen panel.

For example, a resistor contact-type touch screen panel has a structure, which may include a transparent conductive layer made of Indium Tin Oxide (ITO), Indium Zinc Oxide (IZO) or the like, a spacer, and an air layer in the space between an upper plate and a lower plate. Newton's Rings are common in this structure.

In another example, a capacitive type touch screen panel may include a dielectric layer (which may include, for example $Sb_2O_5$), a conductive layer (such as, for example, a silver or silver alloy) for maintaining a predetermined voltage across the front surface of the touch screen panel, and a separate ITO film layer for blocking static electricity generated from an LCD panel are formed throughout the front surface of the active area of a display. Due to the complexity of such a touch screen panel structure, degradation of the characteristics of the display is inevitable, as described above.

Furthermore, the most commonly used touch screen panels may currently have upper size limitations, as they are mainly composed of a plurality of layers and complex circuitry disposed over the entire screen which scales with display size. Consequently, touch screen panels have been used only with computer-type monitors until now, and commercialization for use with large screen televisions has been relatively low.

Furthermore, considering that mobile applications trend toward thin displays while maintaining high resolution and optical quality, the challenge and motivation to provide a slim touch screen panel technology are significant.

Both mobile and large stationary displays show competitive trends towards high resolution, thinness, multi-functionality, and the integration of separate functions with fewer parts. Thus, there is strong motivation to integrate touch screen panel structures in the display and provide multiple functions while maintaining high image quality display characteristics.

All of the touch screen panels used as described above have structures based on separate touch screen panels that must be added to the display. As a result, there is a need for a touch screen panel that is manufacturable in a form integrated with the display area rather than as a separate panel, while maintaining high image quality.

SUMMARY

Accordingly, an object of the present invention is to provide a display integrated touch screen panel without degrading the characteristics of a display, a method of manufacturing the same and a display comprising the same.

Another object of the present invention is to provide a touch screen panel, the size and thickness which are not substantially increased, being applicable to a large display or a mobile display, a method of manufacturing the same, and a display having the same.

Still another object of the present invention is to provide a touch screen panel in which an ultrasonic wave excitation transducer (hereinafter referred to as an excitation transducer) and an ultrasonic wave detection transducer (hereinafter referred to as a detection transducer) are formed using a plurality of structures in a separate substrate, and are separately attached to the front surface at a predetermined area of the image display unit so as to be opposite each other, a method of manufacturing the same, and a display having the same.

In order to accomplish the above objective, the present invention provides a touch screen panel including an excitation transducer for generating an ultrasonic wave of a predetermined frequency; and a detection transducer for receiving the ultrasonic wave of predetermined frequency, wherein the transducers are attached on a predetermined area of an image display unit so as to be opposite each other.

According to an embodiment of the present invention, the excitation transducer may include a first electrode; a piezoelectric layer formed on a front surface of the first electrode; and a second electrode formed on a front surface of the piezoelectric layer.

According to another embodiment of the present invention, the excitation transducer may include a piezoelectric layer; and first and second electrodes formed on a front surface of the piezoelectric layer to be spaced apart by a predetermined interval.

The touch screen panel may further include a protective layer formed throughout a front surface of an entire structure.

The detection transducer may have a structure identical to that of the excitation transducer.

Additionally, in accordance with an embodiment of the present invention a method of manufacturing a touch screen panel is provided, including forming a plurality of electrode structures spaced apart from each other at predetermined regular intervals on a substrate, each of the structures having a first electrode, a piezoelectric layer and a plurality of a second electrode on a top portion of the substrate; segmenting the electrode structures at predetermined regular intervals; and attaching the segmented electrode structures on a predetermined area of an upper surface of an image display unit so as to be opposite each other.

The method of forming the electrode structures includes forming the first electrode on the front surface of the substrate using a first metallic layer; forming the piezoelectric layer on a front surface of the first electrode; and forming the second electrode on a front surface of the piezoelectric layer using a second metallic layer.

The substrate may be a flexible substrate or a rigid substrate.

The first and second metallic layers may be made of low-resistance material, such as Al, Cu, Ag, Au, ITO or IZO.

For example, the first and second electrodes may be formed from the first or second metallic layer using a sputtering method, and then patterning the first metallic layer and/or second metallic layer in a rectangular shape or a chevron shape.

The piezoelectric layer may be made of ceramic material having a high melting point.

The piezoelectric layer may be made of AlN, ZnO or LiNbO$_3$, lead zirconate titanate (PZT), or other similar piezoelectric materials.

The piezoelectric layer may be automatically patterned by deposition through a metal mask, or it may be patterned using a photolithography and etching process.

The method may further include the step of forming a protective layer on a front surface of the second electrode.

Alternatively, the method of forming the electrode structures may include forming the piezoelectric layer on the front surface of the substrate, and forming and patterning a metallic layer on a front surface of the piezoelectric layer so that two separate portions the metallic layer are formed and spaced apart from each other by a predetermined interval.

The electrode structures may be segmented and attached to a border of the front surface of the image display unit.

The method may further include the step of forming a protective layer on front surfaces of the first and second electrodes.

Additionally, the present invention provides a display having a touch screen panel, the touch screen panel including an excitation transducer attached to an upper surface of an image display unit configured to generate an ultrasonic wave of a predetermined frequency; and a detection transducer attached to the upper surface of the image display unit so as to be opposite the excitation transducer, configured to receive the ultrasonic wave of predetermined frequency.

The display may include a Liquid Crystal Display (LCD), a plasma display panel, or an Organic Light Emitting Diode Display (OLEDD).

According to an embodiment of the present invention, the excitation transducer and the detection transducer may be attached to a thin-film transistor substrate or a color filter substrate of an LCD, or they may be attached to an outer surface of the front plate which normally contains display electrodes on the inside surface of a PDP, or they may be attached to the back surface of a substrate for manufacture of drive circuits of an OLEDD.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
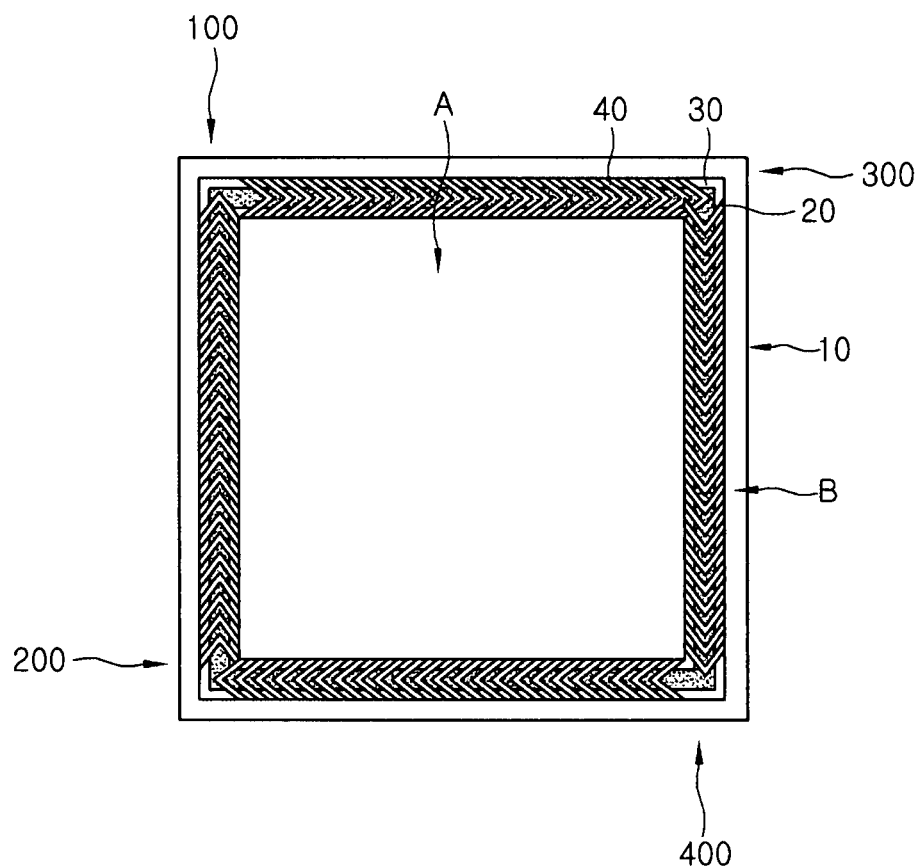
FIG. 1 is a diagram illustrating the image display unit of a display and a touch screen panel attached to the border thereof according to an embodiment of the present invention.

Reference now should be made to the drawings, in which the same reference numerals are used throughout the different drawings to designate the same or similar components.

FIG. 1 is a plan view of a ultrasonic wave detection-type touch screen panel, in which excitation transducers and detection transducers are attached to the border of the front surface of an image display unit according to an embodiment of the present invention.

Referring to FIG. 1, excitation transducers 100 and 300 and detection transducers 200 and 400, which have predetermined widths, are attached to the border of the front surface of an image display unit 10, in a front surface non-display zone B, on which various electrodes are formed, beyond a zone A, which is provided for display. Each of excitation transducers 100 and 300 and detection transducers 200 and 400 may be formed by of a layered structure including a primary electrode 20 made of a first metallic layer having a predetermined width, a piezoelectric layer 30 formed on the front surface of primary electrode 20, and a secondary electrode 40 formed on piezoelectric layer 30 using a second metallic layer. For example, primary electrode 20 and secondary electrode 40 may be formed to have a rectangular shape or a chevron shape. In the present embodiment, primary electrode 20 has a rectangular shape, while secondary electrode 40 has a chevron shape.

Excitation transducers 100 and 300 are respectively attached to the upper and right sides of image display unit 10, and each generate a first ultrasonic wave signal. The first ultrasonic wave signal includes a acoustic wave that propagates along the surface of image display unit 10, and has a frequency within a range, for example, of about 4 to 10 MHz, but which may be higher or lower. When power is applied to first electrode 20 and second electrode 40, at a particular frequency, excitation transducers 100 and 300 generate the first ultrasonic wave signal, which has a predetermined frequency, wavelength and amplitude, determined by the piezoelectric effect, in which the piezoelectric layer 30 converts an electrical signal into an ultrasonic acoustic vibration signal, and the shapes, line-widths and spacing arrangement of electrodes 20 and 40.

Detection transducers 200 and 400 are respectively attached to the left and lower sides of image display unit 10, and receive the first ultrasonic wave signal (i.e., first signal). When the first signal is received, detection in which the piezoelectric layer 30 converts an electrical signal into an ultrasonic acoustic vibration transducers 200 and 400 convert the first ultrasonic signal into an electrical signal due to the piezoelectric effect.

Figure 2A:
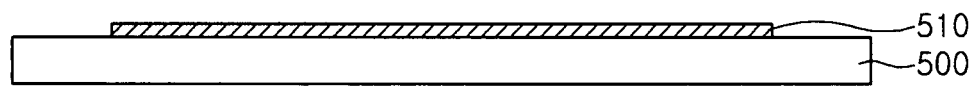
FIGS. 2A to 2C are sectional views illustrating a method of manufacturing a touch screen panel according to an embodiment of the present invention.
Figure 2B:
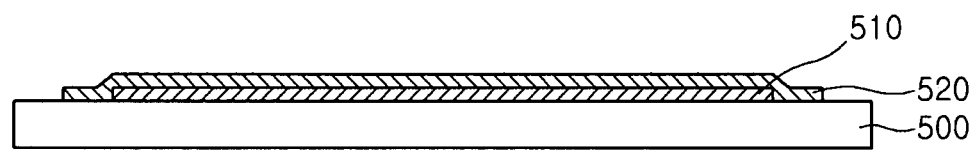
Figure 2C:
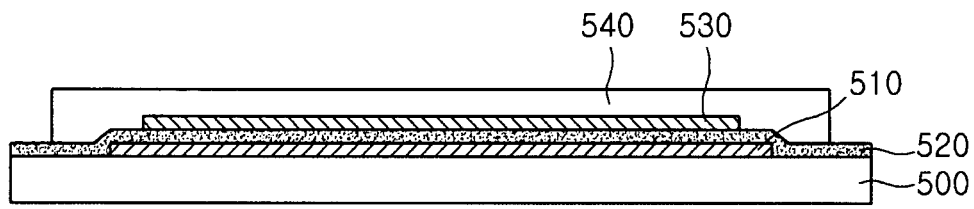

FIGS. 2A to 2C are sectional views illustrating an embodiment of a method of manufacturing the excitation and detection transducers of the touch screen panel.

Referring to FIG. 2A, a primary electrode is formed on the front surface of a substrate 500 using a first metallic layer 510. For example, substrate 500 may be flexible, or it may rigid, such as, for example, a glass plate. First metallic layer 510 may be made of a low-resistance conductive material, such as Al, Cu, Ag, Au, ITO, IZO, etc. The primary electrode made of low-resistance conductive first metallic layer 510 is designed to have a width of a predetermined interval, for example, a width of 10 μm, and a shape which may be formed in a general rectangular shape, or, if there is a demand for such a design, in a chevron shape.

The shape of such a primary electrode varies depending on whether a usage frequency is a single frequency or a plurality of frequencies. That is, in order to use a single frequency, an electrode structure having a single configuration of linewidth and spacing may be used as long as the structure excited by an electric field of appropriate modulation frequency to excite the ultrasonic wave. In order to use a plurality of different frequency ranges for respective pixels at predetermined regular intervals, separate electrode structures of different line-width and spacing are used for respective frequency ranges.

In order to form the primary electrode, first metallic layer 510, made of Al, Cu, Ag, ITO, IZO etc., may be formed using a sputtering method. The primary electrode may have dimensions greater than hundreds of μm, so that, when deposition is performed using the sputtering method, it is possible to use a metal mask, thereby simultaneously performing deposition and patterning. Alternatively, after first metallic layer 510 has been deposited using the sputtering method, patterning may be performed using a photolithography and etching (wet or dry etching) process. Alternatively, another method, such as a method of forming the first metallic layer 510 through sputtering and then directly patterning the first metallic layer 510 using a short wavelength UV high energy laser may be used. Alternatively, a method using screen printing may be used.

For example, in according to an embodiment of the present invention, the formation of an ultrasonic wave detection-type touch screen panel on the front surface of a substrate having a small area, a precise and effective method among the above-described methods is the direct patterning method using a UV laser. The line width of the primary electrode is larger than at least one pixel of a display, and may be on the order of tens to hundreds of μm in dimension. This line width dimension enables direct etching by a laser. Because the melting point of first metallic layer 510 selected may be relatively low, thus it is possible to effectively and easily perform patterning using the instantaneous high heat of a pulsed UV laser. This method is similar to a method of forming an ITO pattern on a flexible film in a resistor-contacting type touch screen panel using an UV laser.

Referring to FIG. 2B, in order to generate an ultrasonic wave having a predetermined frequency, wavelength and amplitude, a piezoelectric layer 520, made of, for example, AlN, ZnO, PZT or LiNbO$_3$, is formed on the front surface of the primary electrode, which is made of first metallic layer 510. Piezoelectric layer 520, which is made of ceramic material having a high melting point, is selectively formed on the front surface of the primary electrode.

The formation and patterning method of piezoelectric layer 520 may be performed using a method which is almost identical to the above-described method of forming and patterning the primary electrode. However, it is effective to form piezoelectric layer 520 using an RF sputtering method through a metal mask, in which a pattern having a predetermined size is formed, or to perform patterning using a photolithography and etching process. However, a method of direct heating using a UV laser to etch piezoelectric layer 520, which is a material having a high melting point as described above, may require a longer process time, which may cause damage to the substrate below, especially if it is of a material other than, for example, glass.

Referring to FIG. 2C, a secondary electrode is formed on piezoelectric layer 520 using a second metallic layer 530. Secondary metallic layer 530 is may be formed of a low-resistance conductive material, made of Al, Cu, Ag, Au, ITO, IZO, etc., using a sputtering method, as with first metallic layer 510. The method of forming the secondary electrode may be identical to the method of forming the primary electrode. Thereafter, a protective layer 540 may be selectively formed, which may be made of SiO$_2$. In this way, electrode structures used as excitation and detection transducers may be manufactured. Alternatively, there may be no need to form protective layer 540. Since the frequency generation reception units are formed around the outer edge of the image display unit, they may be shielded by a bezel cover, and therefore protective layer 540, which functions substantially to prevent scratches or other damage to excitation and detection transducers, may not be required.

Figure 3A:
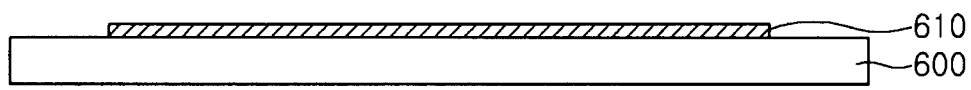
FIGS. 3A to 3C are sectional views illustrating a method of manufacturing a touch screen panel according to another embodiment of the present invention.
Figure 3B:
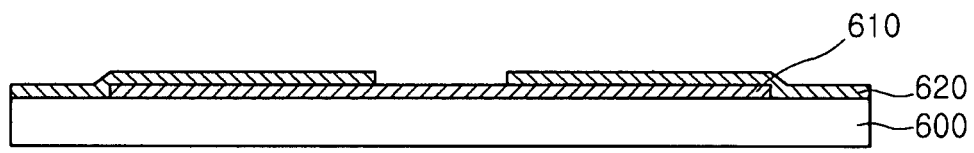
Figure 3C:
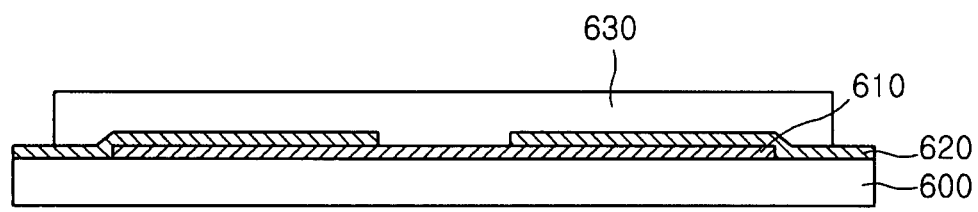

FIGS. 3A to 3C are sectional views illustrating a method of manufacturing excitation and detection transducers for a touch screen panel according to another embodiment of the present invention. This embodiment describes a method of manufacturing excitation and detection transducers using the surface waveguiding effect of a Rayleigh (i.e., surface acoustic) wave to simplify a process in which a piezoelectric layer is formed on a substrate and, thereafter, symmetrical inter-digital electrodes are formed on the same substrate. In such a structure, the excited detection frequency preferentially propagate along the top planar surface, and minimizes the excitation of waves in the thickness direction of the substrate. This results in the advantage that the substrate may be relatively thin, and acoustic energy is effectively concentrated at the surface of the display substrate.

Referring to FIG. 3A, a piezoelectric layer 610, made of AlN, ZnO, LiNbO$_3$, PZT etc., is formed on the predetermined area on the front surface of a substrate, which may be flexible rigid, using a sputtering method. Piezoelectric layer 610 may be formed using a method of performing patterning using a metal mask simultaneously at the time of deposition, or a method of performing patterning using a photolithography and etching process (wet or dry etching) after sputtering, as described above. Alternatively, one may use the method of patterning using an UV laser, described above.

Referring to FIG. 3B, a metallic layers 620 may be formed on piezoelectric layer 610 such that the sides thereof are spaced apart from each other by a predetermined interval, thereby forming primary and secondary electrodes. Metallic layer 620 is formed by depositing a low-resistance metallic layer, made of Al, Cu, Ag, Au, ITO, IZO, etc. Electrode forming may be accomplished using a metal mask during a sputtering process without additionally requiring an etching process as described above. Alternatively, one may form electrodes using a method of direct etching by using a UV laser after the deposition of the film. Alternatively, a method of patterning using a photolithography and etching (wet or dry etching) process may be used. With any method, a predetermined area of piezoelectric layer 610 is exposed, and primary and secondary electrodes, which are spaced apart from each other by a predetermined interval, are formed.

Referring to FIG. 3C, a protective layer 630 may be selectively made of SiO$_2$ material. Thus, electrode structures used as the frequency generation reception units may be manufactured.

The method of manufacturing a touch screen panel, in particular, the excitation transducer and the frequency reception unit, has been described with reference to the sectional views of FIGS. 2A to 2C and FIGS. 3A to 3C. The excitation and detection transducers may be manufactured in the same substrate in a line-form planar structure, which will be described with reference to FIGS. 4A and 4B.

Figure 4A:
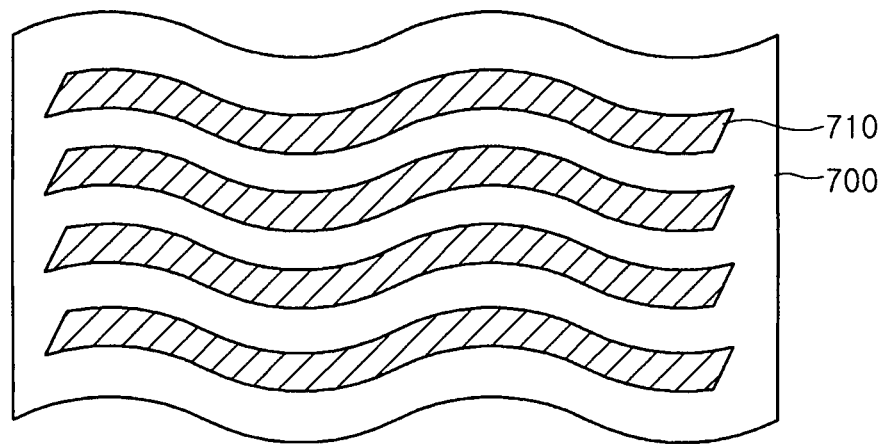
FIGS. 4A and 4B are diagrams schematically illustrating the process in which the touch screen panel according to the embodiment of the present invention is manufactured on a flexible substrate, which is then segmented.
Figure 4B:
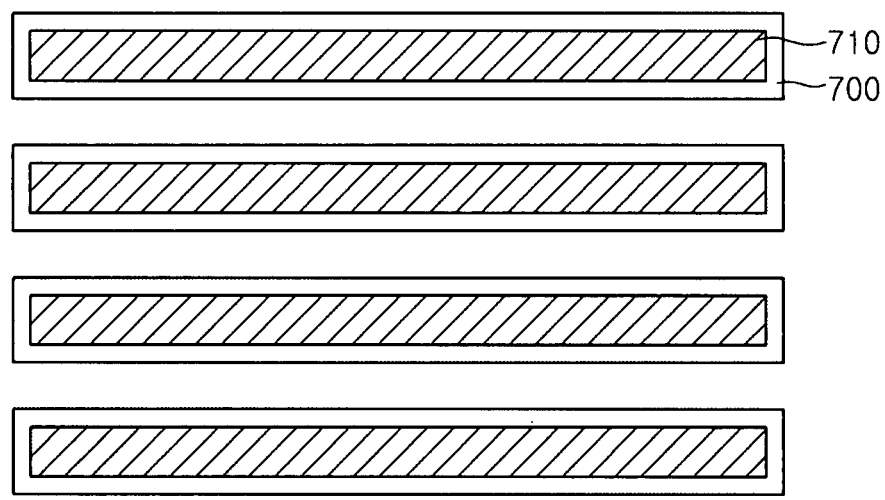
Figure 5A:
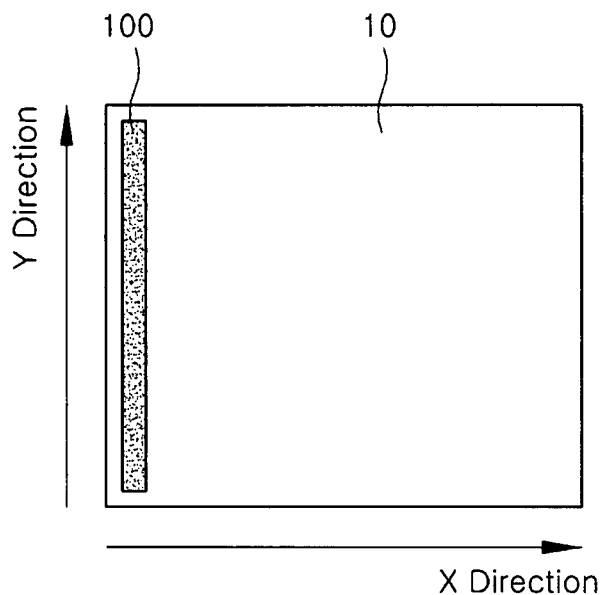
FIGS. 5A to 5D are diagrams illustrating a method of attaching the touch screen panel to the image display unit according to the embodiment of the present invention.
Figure 5B:
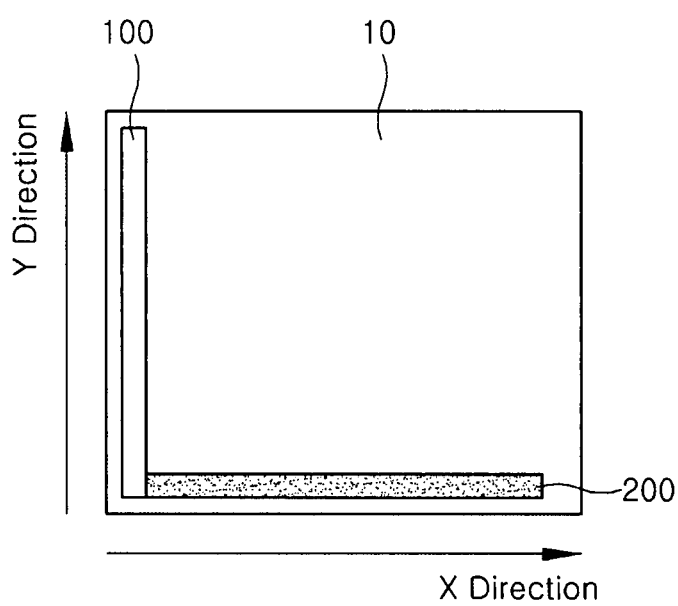
Figure 5C:
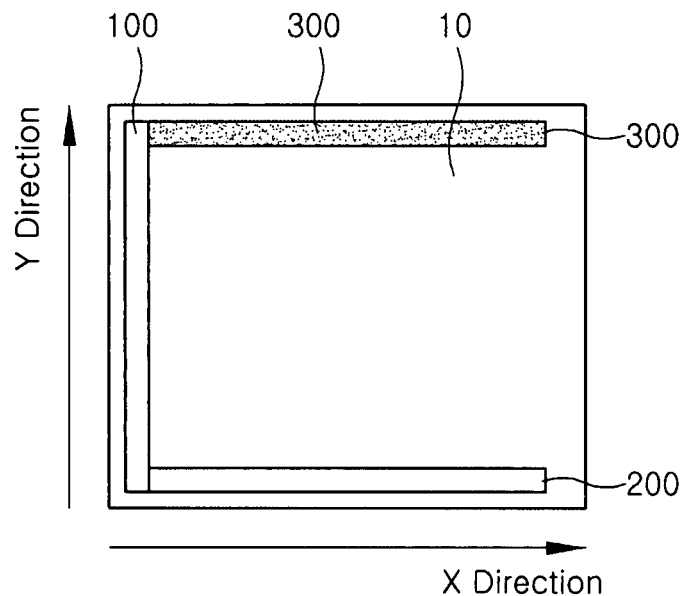
Figure 5D:
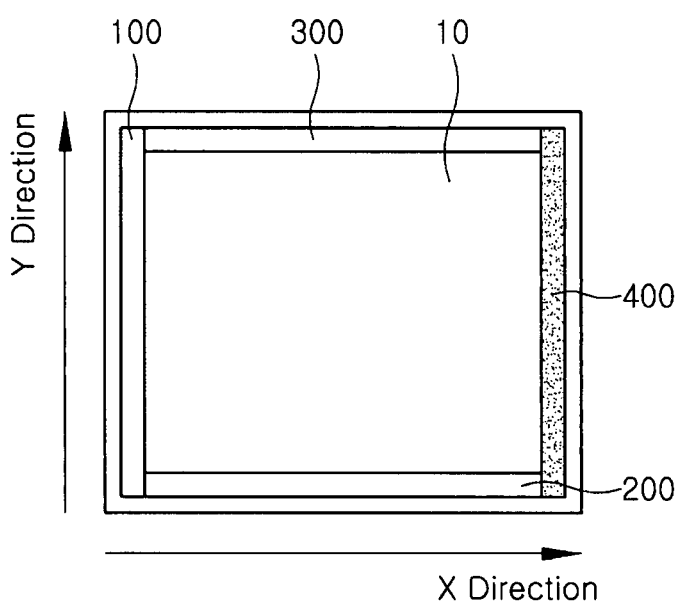

FIG. 4A is a diagram illustrating a planar layout in which a plurality of excitation and detection transducers 710 are simultaneously formed on a flexible substrate 700. The excitation and detection transducers 710, in which a primary electrode, a piezoelectric layer and a secondary electrode are formed on flexible substrate 700, and may be manufactured in a plurality of line forms in consideration of the size of the non-display zone of the image display unit. Furthermore, as illustrated in FIG. 4B, the excitation transducer and the frequency reception unit may be respectively segmented at predetermined regular intervals, and may then be attached to the front surface of the non-display zone of the image display unit, thereby enabling the manufacture of the ultrasonic wave detection-type touch screen panel.

The method of manufacturing the excitation and detection transducers on a flexible substrate may be the same as described above, comprising the formation of electrodes and piezoelectric layer, and will not be repeated here in detail.

For example, a method of manufacturing the ultrasonic wave detection-type touch screen, in particular, the frequency generation unit and the frequency reception unit, which are formed on the flexible substrate, may include forming a low-resistance metallic layer through sputtering, forming primary and secondary electrodes by patterning using an UV laser, then automatically patterning a piezoelectric layer made of ceramic by deposition through a metal mask, or by patterning using a photolithography and etching process.

As an example, a method is described with reference to FIGS. 5A to 5D of sequentially attaching the excitation and detection transducers, described above (either flexible or rigid), to the non-display zone of the image display. As sequentially illustrated in FIGS. 5A to 5D, a Y-directional excitation transducer 100 is attached to the left portion of the non-display zone of the image display unit and an X-directional detection transducer 200 is then attached to the lower portion of the non-display zone of the image display unit. Thereafter, an X-directional excitation transducer 300 is attached to the upper portion of the non-display zone of the image display unit, and a Y-directional detection transducer 400 is then attached to the right portion of the non-display zone of the image display unit, thereby manufacturing the ultrasonic wave detection-type touch screen panel.

Alternatively, when the excitation and detection transducers are properly disposed on the rigid or flexible substrate, the entire substrate may be attached as a single layer structure to the image display unit. As the substrate may be quite thin, there is substantially no adverse affect on the thickness of the overall display. Alternatively, one may separate only desired portions of the excitation and detection transducers from the substrate and attach them separately appropriately to the non-display zone portions, and attach the remaining substrate and remaining excitation and detection transducers appropriately to the remaining non-display zone portions.

The part of the image display unit, to which the excitation and detection transducers are attached, may finally be packaged using an external bezel when the display is assembled, thereby providing a structure whereby excitation and detection transducers are not exposed to the outside. Thus, there in no change in the outward appearance thereof relative to prior art.

Alternatively, an optional protective layer, made of SiO$_2$, may be formed over the entire surface of the display unit which is also capable of propagating surface acoustic waves after the formation of a secondary electrode.

Figure 6A:
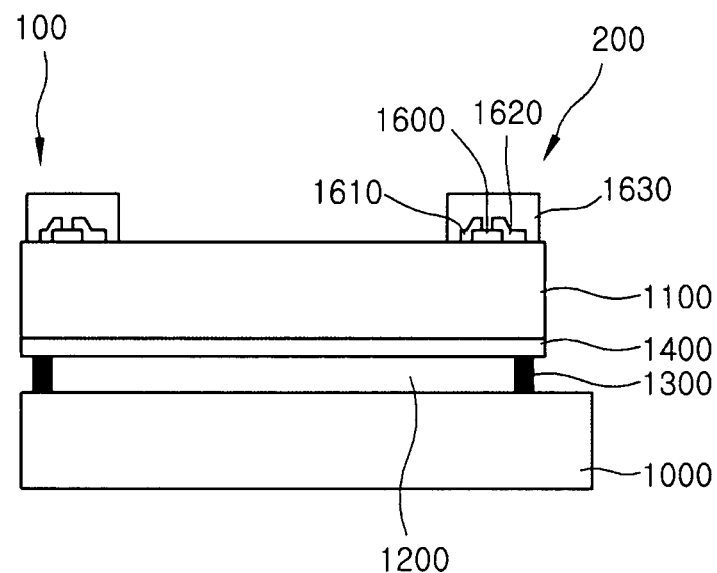
FIGS. 6A and 6B are sectional views of an LCD illustrating a method of forming a polarizer when the touch screen panel is attached to the LCD according to the embodiment of the present invention.
Figure 6B:
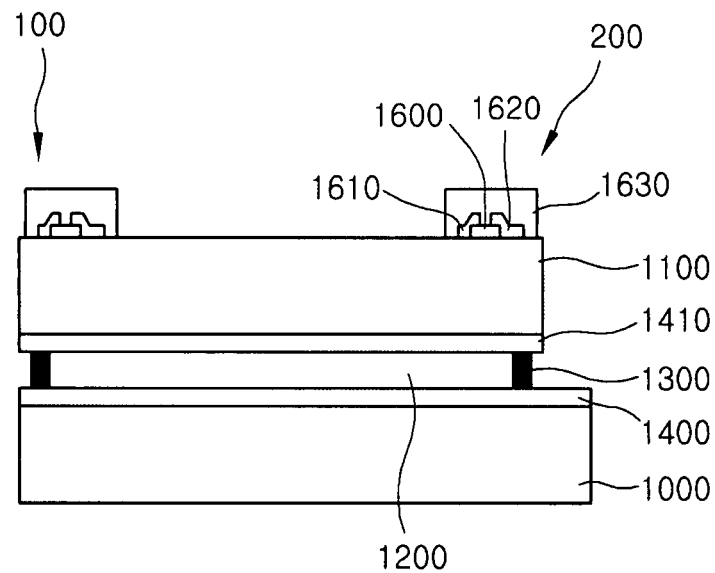

FIGS. 6A and 6B are partial sectional views illustrating various modifications to the process for forming a polarizer of an LCD having the touch screen panel according to an embodiment of the present invention, and illustrate arrangements in which the excitation and detection transducers are attached to the border of the front surface of a color filter substrate. An example is given in which the excitation and detection transducers are formed by first forming a piezoelectric layer and then forming a single metallic layer, which are spaced apart from each other, thereby forming primary and secondary electrodes. Alternatively, the touch screen panel is not limited to being attached to the color filter substrate, and may be attached to a film transistor substrate.

Referring to FIG. 6A, a sealant 1300 for attaching two substrates to each other is formed between a thin-film transistor substrate 1000, on which thin-film transistors and pixel electrodes are formed in a matrix arrangement, and a red-green-blue (RGB) color filter substrate 1100 is formed. Liquid crystal layer 1200 is formed between the thin-film transistor substrate 1000 and the red-green-blue (RGB) color filter substrate 1100. In this embodiment of the present invention, a polarizer 1400 is formed on the surface of color filter substrate 1100. Polarizer 1400 may be a metal wire rigid polarizer or a lyotropic liquid crystal polymer-type internal polarizer. Furthermore, although not shown, a polarizer is formed between the thin-film transistor substrate 1000 and a backlight unit below the thin-film transistor substrate 1000. Furthermore, an excitation transducer 100 and a detection transducer 200 are attached to the border of the front surface of color filter substrate 1100. Each of excitation and detection transducers 100 and 200 is formed of a piezoelectric layer 1600, a primary electrode 1610 and a secondary electrode 1620 formed by a single metallic layer, the sides of which are spaced apart from each other, and a protective layer 1630 formed on the front surface thereof, using the process illustrated in FIGS. 3A to 3C. They may be formed on substrate 700 as illustrated in FIG. 4A, and may be segmented as illustrated in FIG. 4B, and may then be attached using adhesive members.

Referring to FIG. 6B, a first polarizer 1400 may be formed on the surface of thin-film substrate 1000, on which a predetermined structure is formed, and a second polarizer 1410 is formed on the surface of color filter substrate 1100. Each of first and second polarizers 1400 and 1410 may be a metal wire rigid polarizer or a lyotropic liquid crystal polymer-type internal polarizer. Furthermore, excitation transducer 100 and detection transducer 200 are attached to the border of the front surface of the color filter substrate 1100 using the above-described method.

In an LCD having the touch screen panel, the excitation and detection transducers are attached to the front surface of the color filter substrate, so that the color filter substrate is used as surface acoustic wave propagation medium. As an example, in the present embodiment, the polarizer may be included on the opposite surface of a substrate or an LCD panel on which the ultrasonic wave detection-type touch screen panel is operational. A metal wire rigid polarizer or a lyotropic liquid crystal polymer-type internal polarizer may be used as the polarizer.

Although the ultrasonic wave detection-type touch screen panel, according to the present invention, has been described as applied an LCD as one example among planar display devices, it is, not limited to such, and may also be applied to other planar display device, such as Organic Light Emitting Diode Displays (OLEDDs), or Plasma Display Panels (PDPs).

For example, in the case of OLEDDs, the excitation and detection transducers may be attached to the outer surface of a substrate for manufacture of drive circuits or a back substrate, thereby forming a touch screen panel.

For example, in the case of PDPs, the excitation and detection transducers may be attached to the outer surface of the front plate which normally contains display electrodes on the inside surface, thereby forming a touch screen panel.

As described above, according to the present invention, a touch screen panel is implemented by attaching excitation and detection transducers to the border of the front surface of an image display unit, and, the outer surface of the substrate of the display is used as a surface acoustic wave propagation medium. Therefore, since it is not required to manufacture a touch screen panel on a separate substrate, and attach the touch screen panel to the image display unit, image quality is not only maintained, but the thickness and size of displays thereof are also kept from increasing, as compared to implementations in the prior art.

Therefore, if the touch screen panel is applied to a large display device or a mobile display device, the thickness and size of the display are not affected.

For example, for application to a large display having a size of 40 or 50 diagonal inches or more, the excitation and detection transducers may be cut at predetermined regular intervals and attached, so that the ultrasonic wave detection-type touch screen panel can be applied to any size large television or other large electronic display panel by extending the number of transducers.

In order to use a conventional resistor-contact or capacitive detection-type touch screen panel for a large display, a process line for production of substrates for touch screen panels, requires the size of the touch screen panel to be substantially identical to that of the display. By comparison, the present invention does not require such a process line matching the size of every conceivable display size, thereby reducing manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a touch screen panel, comprising:
    forming a plurality of electrode structures spaced apart from each other at predetermined regular intervals, each of the structures having a first electrode, a piezoelectric layer and a second electrode formed on a substrate;
    segmenting the substrate at a predetermined intervals to include at least one of the electrode structures; and
    attaching a first segmented electrode structure on a first peripheral area of a display panel; and
    attaching a second segmented electrode structure on a second peripheral area of the display panel so as to receive a surface acoustic wave signal of predetermined frequency from the first segmented electrode structure,
    wherein the attaching a first segmented electrode structure and the attaching a second segmented electrode structure are performed using an adhesive member.

2. The method as set forth in claim 1, wherein forming the electrode structures comprises:
    forming the first electrode on the front surface of the substrate using a first metallic layer;
    forming the piezoelectric layer on a front surface of the first electrode; and
    forming the second electrode on a front surface of the piezoelectric layer using a second metallic layer.

3. The method as set forth in claim 2, wherein the substrate is a flexible substrate or a rigid substrate.

4. The method as set forth in claim 2, wherein the first and the second metallic layers comprise low-resistance conductive material.

5. The method as set forth in claim 2, wherein the first and the second metallic layers are selected from the group consisting of aluminum (Al), copper (Cu), silver (Ag), gold (Au), indium tin oxide (ITO) and indium zinc oxide (IZO).

6. The method as set forth in claim 2, wherein the first and the second electrodes are formed by forming the first metallic layer or the second metallic layer using a sputtering method, performing radiation using an ultraviolet laser to pattern the first metallic layer and the second metallic layer in a rectangular shape or a chevron shape.

7. The method as set forth in claim 2, wherein the piezoelectric layer comprise ceramic material having a high melting point.

8. The method as set forth in claim 2, wherein the piezoelectric layer is selected from the group consisting of AlN, ZnO, lead zirconate titanate (PZT) and $LiNbO_3$.

9. The method as set forth in claim 2, wherein the piezoelectric layer is automatically patterned through deposition using a metal mask, or is patterned using a photolithography and etching process.

10. The method as set forth in claim 2, further comprising forming a protective layer on a front surface of the second electrode.

11. The method as set forth in claim 1, wherein forming the electrode structures comprises:
    forming the piezoelectric layer on the front surface of the substrate; and
    forming a metallic layer on a front surface of the piezoelectric layer so that the opposite sides of the metallic layer are spaced apart from each other by a predetermined interval.

12. The method as set forth in claim 11, further comprising forming a protective layer on front surfaces of the first and second electrodes.

13. The method as set forth in claim 1, wherein the first and the second segmented electrode structures are attached to a border of the front surface of the image display unit.

14. A display device comprising:
    a display panel;
    an ultrasonic wave excitation transducer formed on a first substrate and attached to a peripheral region of the display panel using an adhesive member; and
    an ultrasonic wave detection transducer formed on a second substrate and attached to the peripheral region of the display panel using the adhesive member so as to receive a surface acoustic wave signal of a predetermined frequency from the ultrasonic wave excitation transducer.

15. The display as set forth in claim 14, wherein the display is a liquid crystal display, a plasma display panel, or an organic light emitting diode display.

16. The display as set forth in claim 15, wherein the ultrasonic wave excitation transducer and the ultrasonic wave detection transducers are attached to an outer surface of a substrate which contains display electrodes on the inside surface of the plasma display panel.

17. The display as set forth in claim 15, wherein the ultrasonic wave excitation transducer and the ultrasonic wave detection transducers are attached to an outer surface of a substrate for manufacture of drive circuits of the organic light emitting diode display.

18. The display as set forth in claim 15, wherein the liquid crystal display comprises a thin film transistor substrate and a color filter substrate, and the ultrasonic wave excitation transducer and the ultrasonic wave detection transducers are attached to at least one of the thin-film transistor substrate or the color filter substrate.

19. The display as set forth in claim 14, wherein the display panel comprises a thin film transistor substrate and a color filter substrate, and the ultrasonic wave excitation transducer and the ultrasonic wave detection transducers are attached to at least one of the thin-film transistor substrate or the color filter substrate.

20. A display device comprising:
a display panel;
an ultrasonic wave excitation transducer formed on a first substrate and attached to a peripheral region of the display panel; and
an ultrasonic wave detection transducer formed on a second substrate and attached to the peripheral region of the display panel so as to receive a surface acoustic wave signal of a predetermined frequency from the ultrasonic wave excitation transducer,
wherein the display panel comprises a thin film transistor substrate and a color filter substrate, and
wherein a first polarizer is formed between the thin film transistor substrate and the color filter substrate.

21. The display as set forth in claim 20, wherein the first polarizer is formed on an opposite side of the color filter substrate where the ultrasonic wave excitation transducer and the ultrasonic wave detection transducer is attached.

22. The display as set forth in claim 21, further comprising a second polarizer formed on the thin film transistor substrate.

23. The display as set forth in claim 22, wherein the second polarizer is formed on a first side of the thin film transistor substrate on which a predetermined structure is formed.

24. The display as set forth in claim 22, wherein the second polarizer is formed between the thin film transistor substrate and a backlight unit below the thin-film transistor substrate.

* * * * *